United States Patent [19]

Hahn et al.

[11] 4,001,377
[45] Jan. 4, 1977

[54] METHOD FOR PRODUCING STABILIZED AMMONIUM NITRATE

[75] Inventors: Heinrich Hahn, Gelsenkirchen-Buer; Hans Heumann; Manfred Schweppe, both of Herne, all of Germany

[73] Assignee: Veba Chemie Aktiengesellschaft, Gelsenkirchen-Buer, Germany

[22] Filed: Oct. 17, 1974

[21] Appl. No.: 515,794

[30] Foreign Application Priority Data

Oct. 18, 1973 Germany .......................... 2352304

[52] U.S. Cl. .............................. 423/267; 423/396; 71/59; 71/64 E
[51] Int. Cl.² ........................................ C05C 1/02
[58] Field of Search ................. 423/267, 396, 265; 71/35, 59, 64 E

[56] References Cited

UNITED STATES PATENTS

| 2,922,697 | 1/1960 | Bell et al. .......................... 423/267 |
| 3,034,858 | 5/1962 | Vives ............................ 423/396 X |
| 3,087,533 | 4/1963 | Graumann et al. ............. 423/396 X |
| 3,366,468 | 1/1968 | Porter ................................... 71/35 |
| 3,367,883 | 2/1968 | Stahlheber ..................... 423/267 X |

Primary Examiner—G. O. Peters
Attorney, Agent, or Firm—Burgess, Dinklage & Sprung

[57] ABSTRACT

Stabilized ammonium nitrate is prepared from ammonium nitrate melts by removing substantially all of the water from said ammonium nitrate melt, then adding polyphosphates in an amount of 0.1 to 1.0% by weight and finally converting the melt to a solid state.

10 Claims, No Drawings

METHOD FOR PRODUCING STABILIZED AMMONIUM NITRATE

BACKGROUND

The invention relates to a method for the stabilization of ammonium nitrate in reference to storage behavior, to thermal stability vis-a-vis modification changes and to the mechanical strength by adding polyphosphates, in particular ammonium, to practically water-free melts or aqueous solutions to be evaporated accordingly.

It is known that one can add Kurrol's salt in amounts of more than 10% by weight to the ammonium nitrate for stabilization. Also magnesium nitrate and other magnesium salts as well as potassium nitrate have been used for this purpose.

Furthermore, fertilizers to which up to 2.5% boric acid or its salts had been added as stabilizers, have been improved further by adding a few tenth percent ammonium sulfate or diammonium phosphate.

Granular ammonium nitrate has been coated or powdered with these or similar substances in a very finely broken up form. In this manner, 0.1 – 2% sodium phosphate, sodium pyrophosphate or sodium polyphosphate, among others, have been used. The disadvantage of this method consists in that additional apparatus is needed for the application of the coatings and that this step in the process prolongs the production time. Furthermore, powder layers of this type have a tendency to separate, the goods become inhomogeneous, and an undesirable dust formation develops easily during the handling of such products during transport, when loading or unloading and during dispersing.

The first mentioned methods require the use of relatively large and in some cases also relatively expensive products or they bring about rather cumbersome methods during preparation, e.g. the proportion of mixtures has to be adhered to exactly.

SUMMARY

It has now been discovered that ammonium nitrate melts can be stabilized in an easy manner prior to molding by freeing the ammonium nitrate melt from water to a great extent, by adding polyphosphates in quantities of 0.1 to 1.0% by weight, by converting the melt finally to a solid form according to known methods.

DESCRIPTION

As polyphosphates are considered pyrophosphates, metaphosphates and the higher polyphosphates of the alkalies and preferably of the ammonium, as well as the corresponding salts of alkaline earth and magnesium. These compounds may be used singly or mixed with one another.

In the technically produced ammonium polyphosphate there is usually present a mixture of diammonium phosphate with various highly polymerized polyphosphates. It has proven that particularly this mixture, which for example can easily be produced according to the German application P 22 64 306.7, has a particularly favorable effect on the stabilization of ammonium nitrate. In particular, it is superior to the use of orthophosphate (compare also the table).

Since ammonium polyphosphate under some circumstances has a tendency to hydrolyze in the presence of water, it is expedient to add this salt only after the major part of the water has evaporated. This is usually the case when the ammonium nitrate melt has reached the maximum of the concentration, i.e. in the sump of the concentration evaporator. Of course, any point between this concentration evaporator and the apparatus which is used for molding can be used, if the dosage is exact and if the melt has sufficiently homogenized prior to molding.

The polyphosphates, which are not endangered by hydrolysis, can under certain circumstances already be added during neutralization or prior or during the evaporation of the ammonium nitrate. In the case of this group of materials, one can use concentrated solutions of these salts, for example also initial products of the preparation, or also one can add the slid salt. - Ammonium polyphosphate should either be added as melt or also in solid form.

For the molding of the ammonium nitrate stabilized in this manner, the customary technical methods such as crystalization, granulation, atomization, etc. can be used. Especially preferred is the prilling-technique. As prilling devices can be used the customary technologized apparatus (nozzles, rotation bodies, etc.).

The use of polyphosphates has numerous advantages as compared to the use of magnesium compounds for stabilization of ammonium nitrate. No installations for the production of magnesium nitrate solution or decomposition containers and filtering devices are needed therefor. It furthermore proves that the magnesium salts do stabilize the product thermally, however, they simultaneously let it become more hygroscopic. Such products must immediately be sacked moistureproof and the packages must be carefully stapled accordingly. In contrast thereto, the material stabilized with polyphosphate is so moistureproof that loose pouring in a warehouse and thus easy putting into and taking out of storage is possible.

The following tabular summary of the critical hygroscopicity (ascertained at 23° C ± 0.5° C) shows the advantages of the polyphosphate additions in the case of prilled ammonium nitrate:

|  |  | Critical Hygroscopicity |
| --- | --- | --- |
| Ammonium nitrate (untreated) |  | 65% |
| Magnesium nitrate | 0.1% Mg | 56% |
| Magnesium nitrate | 0.3% Mg | 55% |
| Magnesium nitrate | 0.5% Mg | 53% |
| $(NH_4)_2 HPO_4$ | 0.3% $P_2O_5$ | 67.5% |
| $K_4P_2O_7$ | 0.31% $P_2O_5$ | 72% |
| Ammonium polyphosphate | 0.4% $P_2O_5$ of that 0.12% Poly-$P_2O_5$ | 72–75% |

The storage stability of the ammonium nitrate prill produced with polyphosphate addition is also further improved in that the strength of the grain of these products increases.

If the grain strength of the individual bodies is tested by an impact test (as described in column 6 under "Schlafprufung" ("Impact Test") of the DAS No. 1,262,247), according to which a falling glass body weighing 6.2 g is dropped onto the grain from a height of 25.4 mm, it then shows that ammonium nitrate prills without stabilizer are destroyed completely. On the other hand, ammonium nitrate prills stabilized with polyphosphate show only minor grain destruction with the same impact load. For example, in the latter impact load, only 25 grains are destroyed out of 100 grains.

If a sample of the stabilized ammonium nitrate prill is subjected to frequent temperature changes between 25° and 45° C, no decrease of the grain strength is detected. In the case of unstabilized ammonium nitrate prills, on the other hand, it becomes evident that here, even without outside strain, a grain destruction takes place.

We claim:

1. A method for producing the stabilized ammonium nitrate from an aqueous solution of ammonium nitrate which consists essentially of reducing the water content of the aqueous ammonium nitrate solution so that the water is present in the amount of up to 0.2% by weight, thereafter adding to the ammonium nitrate composition an agent selected from the group consisting of ammonium polyphosphate and potassium polyphosphate in an amount of 0.1 to 1% by weight, based upon the weight of ammonium nitrate and thereafter forming the resultant composition into a prill by prilling.

2. Method of claim 1 wherein ammonium polyphosphate is added in a molten form to the sump of a concentration evaporator for the ammonium nitrate.

3. Method of claim 1 wherein solidifying of the melt is carried out through prilling at 175° to 185° C.

4. The method of claim 1 wherein ammonium polyphosphate is added in solid form to the sump of a concentration evaporator for the ammonium nitrate.

5. The method of claim 1 wherein ammonium polyphosphate is added in the solid form to a point following concentration of the ammonium nitrate in a concentration evaporator and prior to prilling.

6. The method of claim 1 wherein ammonium polyphosphate is added in molten form to a point following concentration of the ammonium nitrate in a concentration evaporator and prior to prilling.

7. A process according to claim 1 wherein the agent added to the ammonium nitrate solution is an ammonium polyphosphate.

8. A process according to claim 1 wherein the agent added to the ammonium nitrate solution is a potassium polyphosphate.

9. A process for producing stabilized ammonium nitrate from an aqueous ammonium nitrate solution which consists essentially of adding a hydrolysis-resistant polyphosphate in the form of a concentrated aqueous solution to ammonium nitrate which polyphosphate is added in an amount of 0.1 to 1% by weight, based upon the weight of ammonium nitrate, thereafter removing water by evaporation down to a water content of 0.2% by weight and thereafter forming the resultant composition into prills by prilling.

10. A process according to claim 9 wherein the hydrolysis resistant polyphosphate is a potassium polyphosphate.

* * * * *